(12) United States Patent
Christian et al.

(10) Patent No.: US 6,854,010 B1
(45) Date of Patent: Feb. 8, 2005

(54) MULTI-LOCATION MANAGEMENT SYSTEM

(75) Inventors: Seth Christian, Atlanta, GA (US); Kent Churchill, Atlanta, GA (US); Jeffrey Dale Stivers, Roswell, GA (US); Mark Tyson, Marietta, GA (US)

(73) Assignee: BlueCube Software, Inc., Alpharetta, GA (US)

(*) Notice: Subject to any disclaimer, the term of this patent is extended or adjusted under 35 U.S.C. 154(b) by 716 days.

(21) Appl. No.: 09/888,666

(22) Filed: Jun. 25, 2001

Related U.S. Application Data

(60) Provisional application No. 60/281,837, filed on Apr. 5, 2001.

(51) Int. Cl.[7] .......................... G06F 15/173; G06F 15/16
(52) U.S. Cl. ........................................ 709/223; 709/219
(58) Field of Search .................................... 709/223, 219

(56) References Cited

U.S. PATENT DOCUMENTS

| | | | | |
|---|---|---|---|---|
| 5,802,518 A | * | 9/1998 | Karaev et al. ................. 707/9 |
| 6,125,384 A | * | 9/2000 | Brandt et al. ................. 709/203 |
| 6,466,970 B1 | * | 10/2002 | Lee et al. .................... 709/217 |
| 6,490,587 B2 | * | 12/2002 | Easty et al. ................... 707/10 |
| 6,584,454 B1 | * | 6/2003 | Hummel et al. ............... 705/59 |
| 6,662,217 B1 | * | 12/2003 | Godfrey et al. ............. 709/219 |
| 6,725,446 B1 | * | 4/2004 | Hahn et al. .................. 717/103 |
| 2002/0073085 A1 | * | 6/2002 | O'Day et al. .................. 707/10 |

\* cited by examiner

*Primary Examiner*—Krisna Lim
(74) *Attorney, Agent, or Firm*—Kilpatrick Stockton LLP

(57) ABSTRACT

A centralized real-time multi-location management system that manages the exchange of location-level service data to a central server, as well as provides a secure firewall for the location-level systems through a network transceiver at each property. The network transceiver receives data from the location-level service and transmits and receives the data to and from the remote central server. At the central server, each property's data are integrated into a central database for use by a variety of central application services accessible by users through thin-client user interfaces.

26 Claims, 8 Drawing Sheets

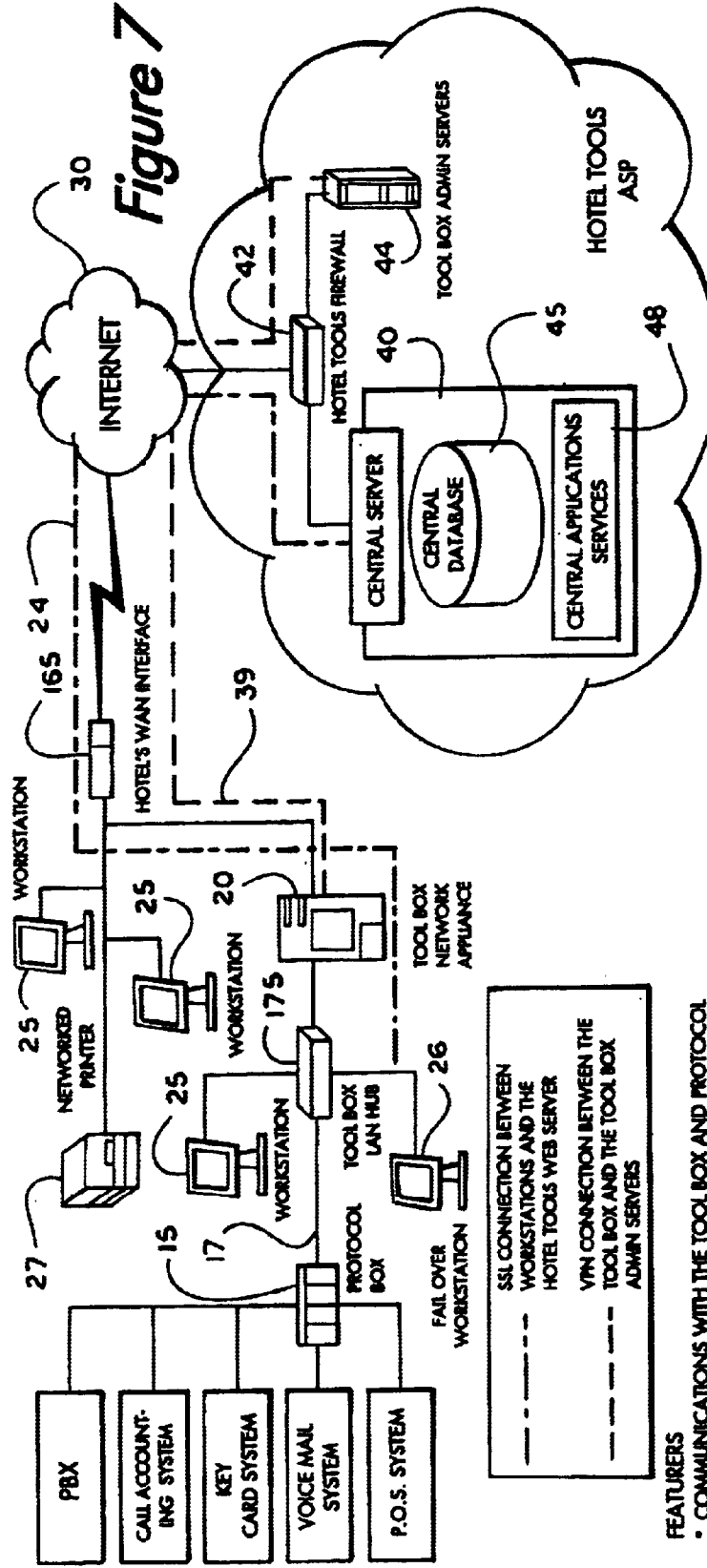

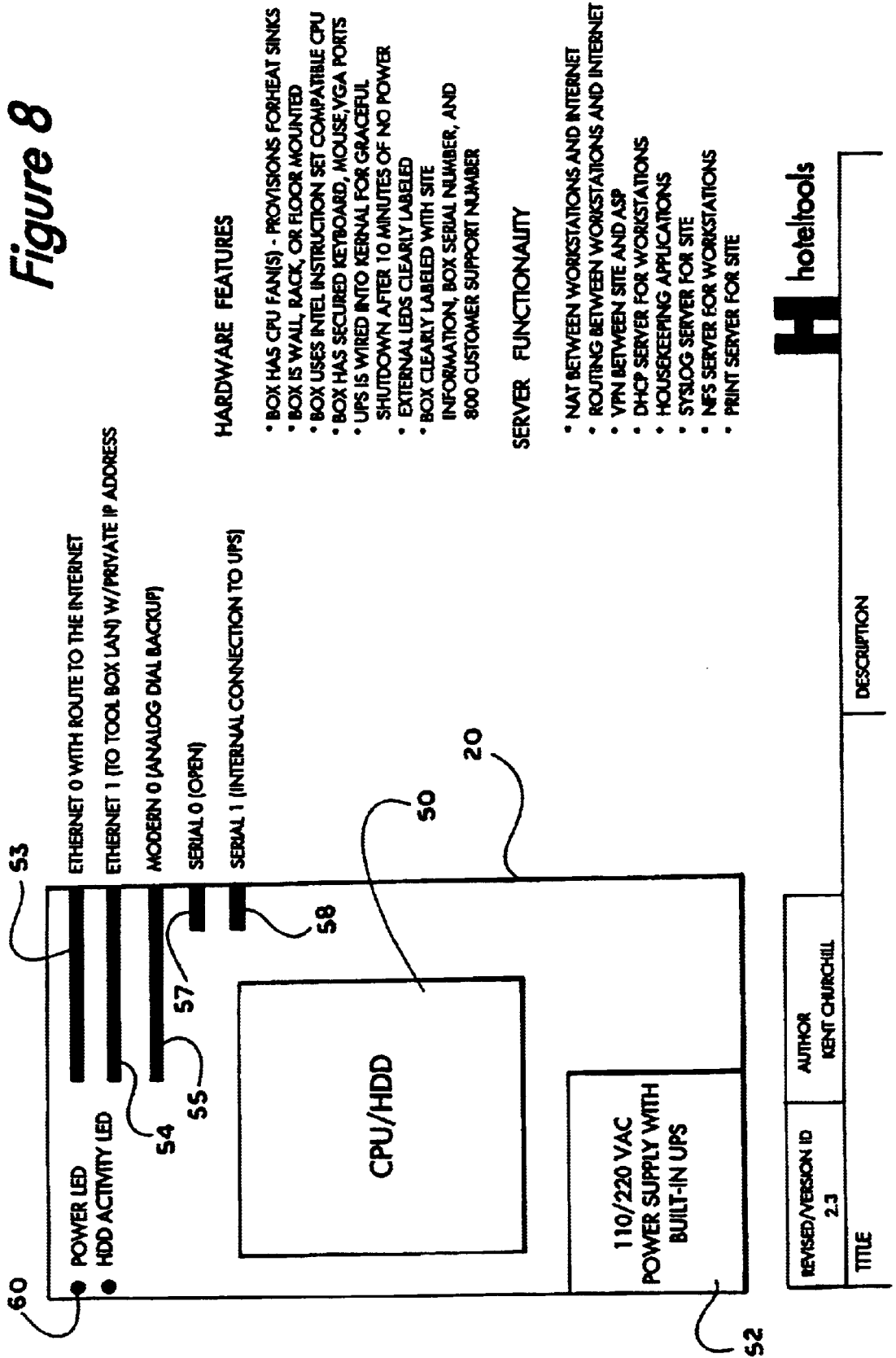

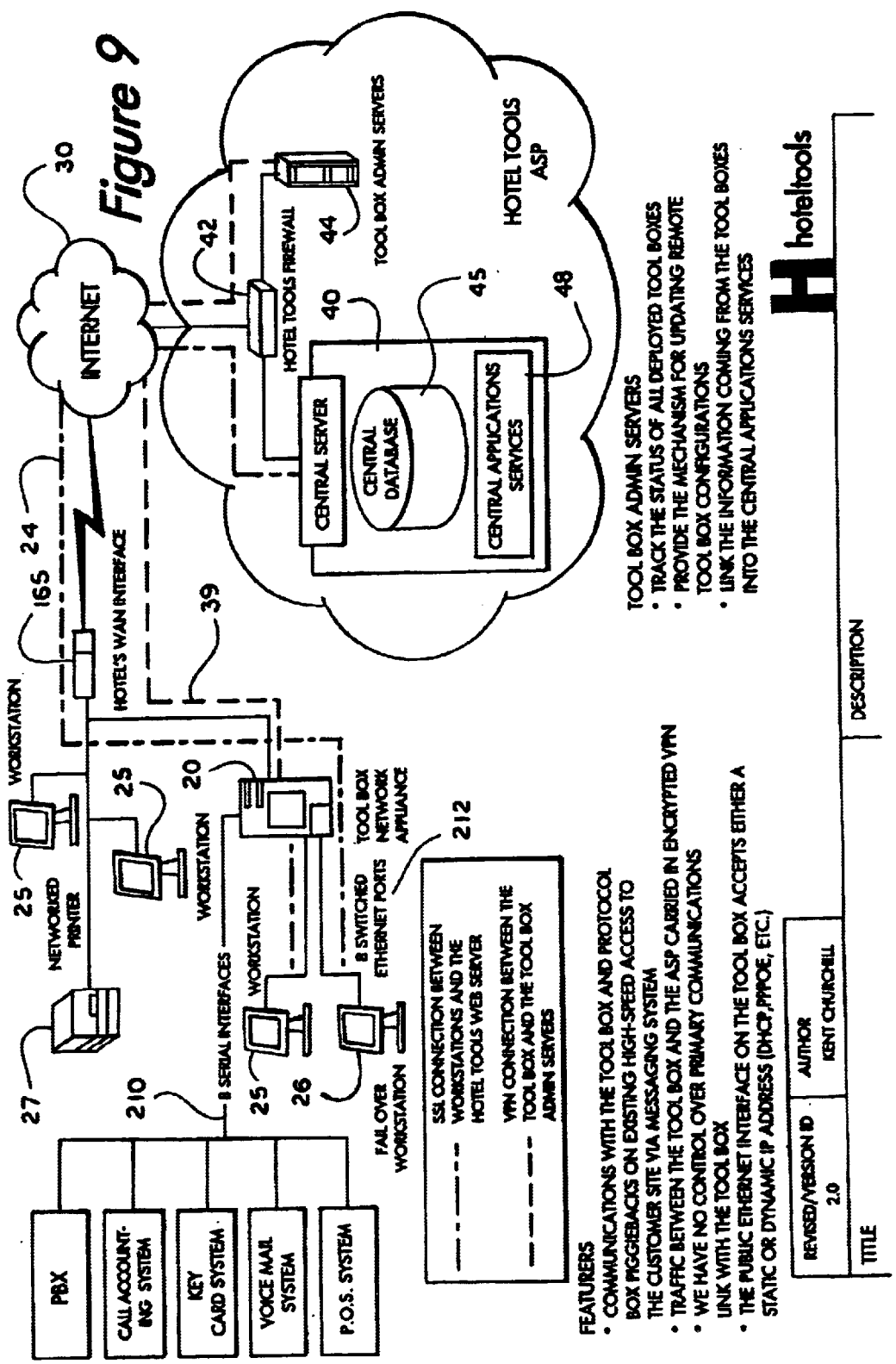

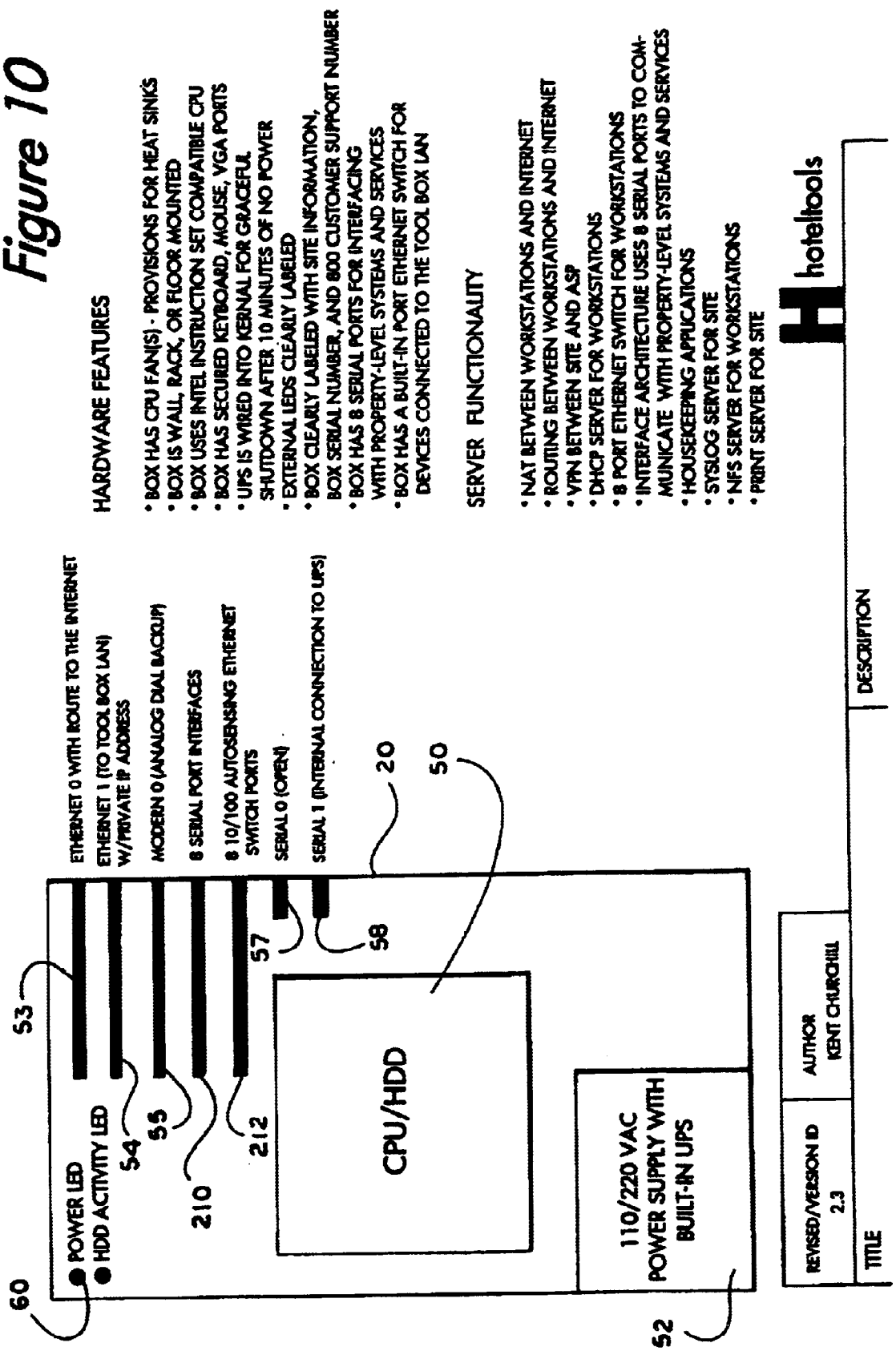

MULTI-LOCATION MANAGEMENT SYSTEM

CROSS-REFERENCE TO RELATED APPLICATIONS

This application claims priority to provisional patent application Ser. No. 60/281,837 filed Apr. 5, 2001, which is relied on and incorporated herein by reference.

BACKGROUND

Prior art property management systems have typically focused on the management of information and services on a property by property basis. Particularly in the hospitality industry, the management of guest services, such as in-room movies, mini-bar, telephony, real-time room availability, and the like, is handled on local, location-level computer networks. The disadvantage of such localized management systems is that a multi-location owner must manage each property through independent, disparate systems.

In addition to the inefficiency of maintaining independent management systems for each property, the cost of hardware and software for each property rises in proportion to the number of properties requiring such systems. Accordingly, there is a need for a multi-location management system that is focused at the enterprise level, rather than the location-level.

Based on the application service provider (ASP) model, the present invention integrates the management of multiple properties through real-time, remote access to a single management system providing application and data management services across multiple properties.

An ASP typically provides individuals or enterprises access to applications and related services over a computer network, such as the Internet, for applications that would otherwise be individually located on personal or enterprise computers. This sharing of applications and services reduces the costs for individuals and enterprises in purchasing and licensing hardware and software. Through a user interface, such as a web browser in the case of Internet-based ASP's, a user can access the application and services of the application service provider. Through a centralized database, the ASP can process data and transactions for multiple users in an integrated environment.

Although the ASP model works well in environments where all data is exchanged and initiated by users connected to the ASP, property management applications provide a unique challenge to the adaptation of an ASP solution because of the need for two way communication to many location-level services. For example, in the hospitality industry, data associated with mini-bars, in-room movies, telephony services, room keys, and the like, needs to be utilized to automatically provide billing and tracking data to a property management system. In particular, the integration of data from such location-level services across multiple properties presents data delivery, security, and data processing issues that must be overcome to provide a unified, real-time multi-location management system.

The present invention answers these challenges by providing a centralized real-time multi-location management system through a "smart" network transceiver at each property. The transceiver manages the exchange of location-level service data to a central server, as well as provides a secure firewall for the location-level systems connected to the network transceiver.

SUMMARY OF THE INVENTION

A multi-location management system for integrating property-specific data from multiple properties is disclosed. Specifically, a multi-location management system comprising a location-level service connected through a network transceiver delivering location-level service data to a remote central server accessible by users through a user interface, such as a web browser, is disclosed.

In an embodiment of the invention a plurality of properties is connected to a remote central server on a computer network. Each property includes a network transceiver connected to location-level services at the respective property. The network transceiver receives data from the location-level services and transmits and receives the data to and from the remote central server. At the central server, each property's data can be integrated into a central database for use by a variety of central application services accessible by users through thin-client user interfaces, such as web browsers.

Location-level services may include any services associated with the property that provide data to the network transceiver. In an embodiment of the present invention for use in the hospitality industry, such services include call accounting subsystem (CAS), private branch exchange (PBX), room keys, mini-bar, telephony, Internet access, key card systems, point of sale systems, energy management systems, in-room safe systems, in-room fax systems, video check-in and check-out, parking gate systems, ticketing systems, electronic door lock systems, interactive voice response systems, voice mail, and in-room movies.

In an embodiment of the present invention the network transceiver includes a central processing unit and hard disk drive, an uninterruptable power supply, Ethernet ports for connecting to PCs/workstations at the property, serial ports for connecting to location-level services, keyboard, mouse, and VGA ports, and one or more modems to connect to the central server. The network transceiver may also include a firewall to provide security to the workstations and any devices connected to the network transceiver. Property data and network transceiver management data is sent and received to and from the central site via a messaging system. The messaging system acts as a reliable transport mechanism for this information.

BRIEF DESCRIPTION OF THE DRAWINGS

FIG. 7 is a schematic diagram depicting the interconnection of location-level services, a protocol box, and workstations at a property through a properly level network transceiver to a remote central server on the Internet in an embodiment of the present invention.

FIG. 8 is a schematic diagram depicting the components of a network transceiver for connection to an external Ethernet hub/switch and a protocol box in an embodiment of the present invention.

FIG. 9 is a schematic diagram depicting the interconnection of location-level services, a protocol box, and workstations at a property through a properly level network transceiver to a remote central server on the Internet that does not include a protocol box.

FIG. 10 is a schematic diagram depicting the components of a network transceiver not connecting to a protocol box in an embodiment of the present invention.

DETAILED DESCRIPTION OF THE INVENTION

The present invention provides a multi-location management system that permits real-time sharing of data from multiple properties and eliminates redundant and unsynchronized record keeping. Based on an ASP model for providing application services utilizing data from a central database over a wide area network, the system of the present invention captures data from location-level services across multiple properties through a self-configuring network transceiver at each property. Users access central application services and exchange data with the central server through a thin-client interface, such as a web browser, over the Internet. The consolidation of data from multiple properties into a central database integrated with central application services eliminates the need for independent systems at each property, and permits real-time exchange of information and conducting transactions which can be accessed anywhere the Internet is available, thus providing an additional convenience and potential reduction in expense to the user.

Although the embodiments of the present invention are described in the context of the hospitality industry, particularly the integration of hotel application services for multiple hotel properties, the embodiments are presented only by way of example. Those of ordinary skill in the art will appreciate that the system of the present invention may be utilized in a variety of multi-location environments, including hospitals, apartments, condominiums, office buildings, restaurants, and similar properties generating location-level services data.

Other examples of other embodiments of the present invention include non-real time remote monitoring and control applications (such as a remote pumping station) that are controlled from a centralized location, centralized HVAC management, centralized elevator management, and parking gate controls.

Figure 1:
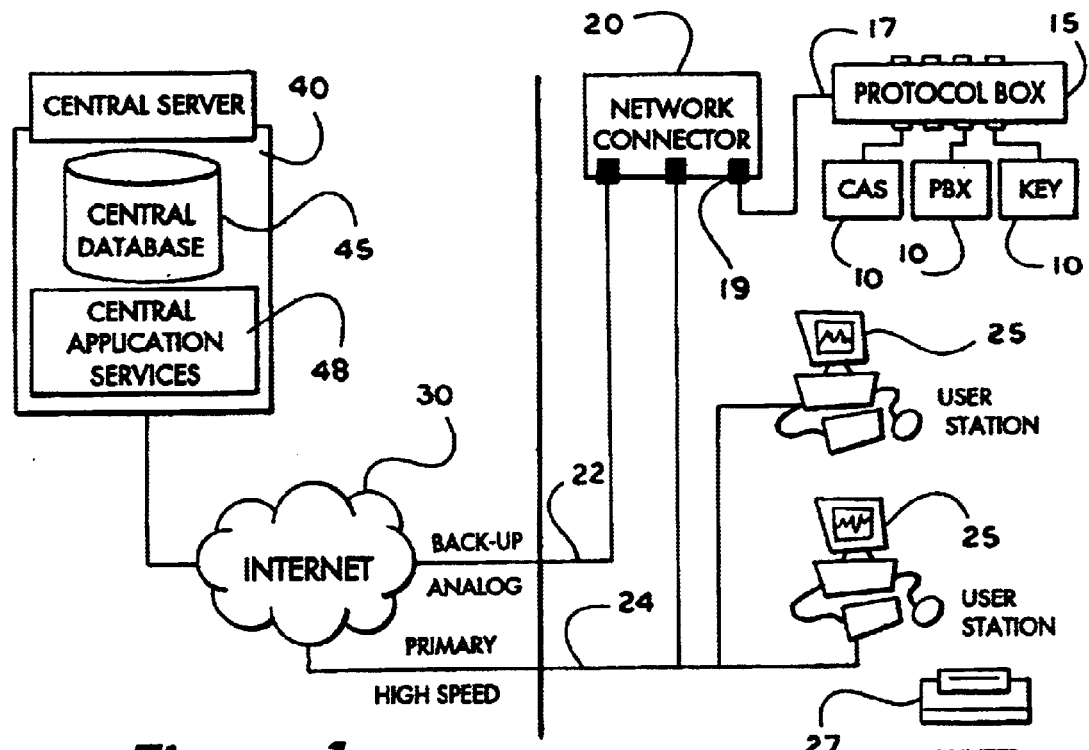
FIG. 1 is a schematic diagram of the network architecture showing the connection of location-level services, an optional protocol box, and user workstations to the Internet through a location-level network transceiver for exchanging data with a remote central server in an embodiment of the present invention.

Referring to FIGS. 1 and 7, in one embodiment of the present invention a location-level service 10 is connected to an optional protocol box 15. Location-level services 10 in the context of a hotel property may include call accounting subsystem (CAS), private branch exchange (PBX), room keys, mini-bar, telephony, Internet access, key card systems, point of sale systems, energy management systems, in-room safe systems, in-room fax systems, video check-in and check-out, parking gate systems, ticketing systems, electronic door lock systems, interactive voice response systems, voice mail, in-room movies, and other such devices. In alternative environments, location-level services may include HVAC systems, elevator systems, alarm systems, and the like. An Ethernet connection is preferably used to connect the location-level services 10 to the protocol box 15.

The protocol box 15 connects to network transceiver 20 with an Ethernet connection 17 at network transceiver port 19. The protocol box 15 may be a stand-alone interface for capturing data from multiple devices or may be a universal interface integrated in the network transceiver 20 in which a plurality of network transceiver ports support connection and data capture from the location-level services 10.

The protocol box 15 is essentially a box with one Ethernet connection and several serial RS232 ports. An exemplary protocol box 15 is a Comtrol box that provides specific interfaces for most PBX, call accounting, room key encoders, in-room movie billing systems or other billable services in use within the lodging industry. The protocol box 15 communicates with these devices through the serial interfaces and relays the acquired information to the property management system using a Berkley Sockets programming interface.

Referring to FIGS. 8 and 10, the components of the network transceiver 20 preferably include: (1) Motherboard, (2) ATX form factor, (3) Memory expandable as needed, (4) Intel or Intel compatible CPU 50, (5) on-board video, keyboard, parallel and USB ports (6) at least two IDE disk drives, each on its own IDE controller for redundancy, (7) LED indicators 60 & 62 that plug on the motherboard for power indication and disk activity, (8) at least one on board serial port 58 configurable as COM3 or greater for connection with uninterruptible power supply (UPS) shutdown interface, (9) at least four PCI slots (three are required, if there is a NIC integrated onto the motherboard), (10) at least two PCI 56 Kbs modems (preferably not "WinModems" which require additional OS support), (11) a power supply 52 housed in the enclosure with a power rating at least 50% greater than the combined power draw of all components, (12) UPS with surge control capabilities housed in the enclosure. The UPS must be of the appropriate dimensions to fit within the enclosure. It must provide at least fifty minutes of battery uptime for a moderately quiescent system. The UPS must have a connection to the motherboard by serial cable (hence the required serial port on the motherboard) to provide communication between the UPS and the operating system and facilitate a graceful shutdown of the computer in the event that power is not restored. The graceful shutdown threshold should be configurable by time (e.g. shutdown after 15 minutes of no AC) or when a determined percentage of battery reserve is exhausted (e.g. shutdown when battery is down to fifteen percent of capacity), and (13) surge protector for modem phone lines.

Referring to FIG. 8, a network transceiver 20 for use in the embodiment of FIGS. 1 and 7 with a protocol box 15 includes a central processing unit and hard disk drive 50. The network transceiver 20 also includes a power supply 52, such as a 110/220 VAC with a built-in uninterruptable power supply (UPS) in the event the line-provided power supply fails.

The network transceiver 20 is preferably a self-contained, computing device that will not require or allow access by non-certified personnel. A customized case contains a system bus, motherboard/CPU 50, memory, disk drives, a power supply 52 and a battery backup.

The case is preferably wall-mounted and locked down with a lead seal to deter and detect tampering and physical intrusion into the case. The case is preferably tagged with a permanently attached emblem containing information such as the name of the property, site serial number of the ToolBox, and the phone number for technical support. A barcode may also be attached for rapid scanning of such information.

Air vents are also preferably located on the sides or bottom of the case to prevent water or fluids from dripping onto electrical components from above.

A heat sink is preferably integrated into the case and is the preferred method for preventing the CPU from overheating. However, a cooling fan may be used as necessary.

To prevent tampering, keyboard, mouse, parallel, serial, USB and video ports and a keyboard are locked behind a panel. Similarly, the power switch is preferably set to the "on" position and only accessible from inside of the case.

In an embodiment of the present invention, if the line power supply fails necessitating use of the UPS, the transfer of data may be completed and a graceful shutdown of the network transceiver accomplished. Specifically, the UPS is connected to the operating system's kernelkernel for graceful shutdown through a power management application after the power fails for more than ten minutes. All characteristics of this graceful shutdown including percentage battery remaining and duration of power outage before shutdown are remotely and locally configurable through software on the network transceiver 20.

With continuing reference to FIG. 8, the network transceiver includes port 53, an Ethernet port connected to external networking equipment, connecting to the Internet. Port 54 of the network connection 20 is an Ethernet port with a private IP address. This port connects to an Ethernet LAN hub or switch. Users' workstations connect to this switch and the network transceiver 20 routes the traffic to the Internet 30 (FIG. 7). Modem port 55 provides automatic analog dial backup for the network transceiver 20. The network transceiver 20 preferably utilizes Ethernet 53 for the primary high-speed Internet connection to the Internet service provider. However, other physical layer interfaces such as T-1/Frame Relay with integrated CSU/DSUs or high speed synchronous serial interfaces can be used instead of Ethernet to connect to the Internet service provider or the WAN on a customer's network. In the event of an interruption of service to the Ethernet interface 53 that accesses the Internet, the network transceiver dials into the Internet 30 through modem port 55 to reestablish connectivity. Serial port 58 of the network transceiver 20 is an internal connector to the UPS. Serial port 57 is preferably an open port that can be configured as a serial console access port to the network transceiver's operating system negating the need for a Video Graphics Array (VGA) monitor.

In an embodiment of the present invention, the network transceiver 20 is installed with Linux configured to the following specifications:

1. The Linux kernel is upgraded to the latest stable 2.2 release and recompiled for efficiency and less complex operation. The configuration operations are as follows:
   a. All kernel drivers possible are compiled into the kernel and not as modules. Kernel modules are a good choice for systems with configurations that change often, but are not a good choice for static embedded systems.
   b. Software RAID (md) support is included with RAID level 1 support. This provides the mirroring support necessary for the redundant partition features needed.
   c. IP Firewall support. This support is necessary to provide control over network tranceiver 20 communications to the outside and inside segments.
   d. IP Masquerading support. This allows all internal clients to communicate to the Internet using the address of the network transceiver 20.
   e. FreeS/WAN code integrated. The FreeS/WAN software adds IPSec support to the kernel.
2. Linux installation preferably includes only components necessary to run the system, to minimize space, enhance security, and allow for easier maintenance.
3. In one embodiment of the present invention, a Red Hat "kickstart" configuration for installation of the system is used so that later creation of test systems have good documentation of what packages are installed, rather than selecting and deselecting packages by hand upon installation.
4. Once the system has been installed and brought up for the first time, all non-essential network services are preferably disabled, including Telnet, FTP, all remote execution services, and all RPC services. File transfer and remote login functionality are provided by OpenSSH package.
5. A kernel firewall is configured to deny all external connections unless specifically allowed, and is set up to provide IP Masquerading services to the internal clients, allowing them to browse WWW and other services.

Network transceiver's 20 further operating tools include FreeS/WAN, Arpwatch, Network UPS, OpenSSH, Sudo, TCPdump, CVS, and Dynarmic Host Control Protocol daemon (DHPCd).

Linux FreeS/WAN is an implementation of IPSEC & IKE for Linux. IPSEC is Internet Protocol Security. It uses strong cryptography to provide both authentication and encryption services. Authentication ensures that packets are from the correct sender and have not been altered in transit. Encryption prevents unauthorized reading of packet contents.

These services allow the construction of secure tunnels through untrusted networks. Data passing through the untrusted network is encrypted by the IPSEC gateway machine and decrypted by the gateway at the other end. The result is a Virtual Private Network, or VPN. This creates a network that is effectively private even though it includes machines at several different sites connected by the insecure Internet.

The network transceiver 20 is installed with FreeS/WAN software to provide a secure VPN tunnel from a property to the remote central server 40 (FIG. 1) site. A secure tunnel to a VPN server (or servers) is established at the central site that functions as a router to systems on the central network. This central VPN server is a Linux machine running FreeS/WAN, or, alternatively, may run firewall/VPN software that supports IPSEC protocols. Checkpoint systems, among others, are known to support FreeS/WAN clients.

An Arpwatch package preferably provides notification of additions and changes to the IP infrastructure on the local area network (LAN) of the system of the present invention. This includes unauthorized additions of network devices that could create support issues.

Arpwatch watches the network transceiver's Address Resolution Protocol (ARP) table. When a new system comes up on the network, it must send broadcast messages to all hosts in order to discover the Ethernet hardware address of machines it wishes to contact. The hardware address of the new device is included in this message. When Arpwatch sees a new hardware address, it will look up the manufacturer of the device based on this address and issue a notification to the system.

Arpwatch preferably issues notifications via the UNIX "syslog" service; depending on messaging infrastructure, these notifications can be delivered directly to the central system of the invention or can be logged locally. If logged locally, a daemon on the local system can watch for these notifications and notify the central site via another messaging infrastructure.

A Network UPS Tools package monitors several types of Uninterruptible Power Supplies (UPS) from various vendors. In the event of a power failure, notifications are issued and graceful shutdowns are triggered before the UPS battery gives out. Additionally and optionally, other systems can communicate over the network with the network transceiver 20 and shut themselves down as well.

As necessary, the remote central server 40 can retrieve information remotely concerning the status of the power supply and integrated UPS 52 at the property site. This facilitates troubleshooting efforts under certain circumstances.

OpenSSH is an open-source licensed secure shell suite providing encryption for network services like remote login, remote file transfer, and robust authentication services.

OpenSSH is utilized on the system of the present invention to provide all remote access for administration purposes that cannot be handled remotely via the messaging system and require a sysadmin's direct intervention. It replaces the following (insecure) services in functionality: telnet, remote copy (rcp), rlogin, rsh, rcmd, and ftp. In addition to encryption and strong authentication, OpenSSH also compresses its communications to present less of a load to the VPN tunnel traffic while transferring files.

OpenSSH can listen for connections over the VPN tunnel connection, or via the Internet to enable remote administration even if the VPN tunnel is not established.

Sudo package provides means for limiting access to the "root" superuser account on the system of the present invention as well as logging what commands are executed from the superuser account.

The UNIX system, on which Linux is based, requires most administration to be performed under the account "root" that has complete control of the machine. Administration problems can ensue when too many individuals have unlimited access to this account, because they are able to log in and make changes with no logs being generated unless they update them manually.

With Sudo, a configuration file allows normal users to execute certain commands, such as cleanup scripts and server restarts. This execution is logged via "syslog," and this log can be sent to the central site to provide a change trail in case of later support issues.

The TCPdump package provides the system of the present invention with "network sniffer" capability that can be useful when troubleshooting network issues. TCPdump can be used in real-time mode to display network traffic, or it can log network packets into a file for later analysis. This package understands a large number of Internet protocols and can help interpret packets it intercepts. For example, an ARP request is labeled as such with the source and destination hosts deciphered.

TCPdump also has filtering capabilities to allow the user to only capture and inspect traffic to/from certain hosts that can help limit the large amount of data that would be logged in a "full traffic" session.

CVS is a version control system. It allows the user to retain old versions of files, such as configuration files or source code, and keep a log of the changes made, who made them, and the reason for the change. It also allows the user to quickly revert to an older version of a configuration file in the event that a change had undesirable effects. CVS helps to manage releases and to control the concurrent editing of source files among multiple authors. It also allows triggers to be specified to enable, log, and control various operations. CVS works well over a wide area network (WAN).

DHCPd, the Dynamic Host Control Protocol daemon, responds to configuration requests from clients that are starting up on the network. It is used to provide these clients with their network settings, such as IP address, subnet mask, gateway, etc.

Preferably, daemon allows centralized control of configurations on the thin client machines. The configuration files allow for static IP addresses to be assigned and provide a good record of low-level Ethernet hardware addresses.

In an embodiment of the present invention, the network transceiver 20 also uses several scripts to enable functionality.

Because a network transceiver 20 is installed by imaging a hard drive storing the initial configuration, a start-up script is needed to enable each individual server to be customized for a specific property. The start-up script configuration includes the following:

1. Network settings—IP address, subnet mask, default gateway, and broadcast address. These settings will control several applications, including DHCPd, ARPwatch, FreeS/WAN and OpenSSH.
2. Hostname
3. Site Name and ID
4. Client Ethernet hardware addresses
5. Custom login information, if needed
6. Alternate telephone numbers/login information for modem backup links In an embodiment of the present invention, a log-monitoring script is utilized to watch the "syslog" log files on the system and issue alerts to support staff by another means. Alternatively, the present invention can be configured to deliver logs directly to the remote central server 40.

Another function of the log-monitoring script is to monitor connectivity and execute failover routines in the event that primary connectivity is lost. This involves bringing up a modem link and changing routing table information to use that link as well as re-establishing secure VPN tunnels.

Finally, the log-monitoring script watches for disk problems and acts accordingly. For example, in the event of a disk failure, the failed drive will be configured out of the mirroring process and a notification generated to support staff. The notification is enclosed in a message that is sent to the remote central server 40 in the same manner as all other messages between network transceivers 20 and the remote central server 40. Once inside the remote central server 40, the message is placed in the database. A database trigger notes the message type and generates an email to the support staff and opens a trouble ticket in the customer support system.

FIG. 10 illustrates an alternative network transceiver 20 for use in the embodiment shown in FIG. 9. The primary physical differences from the transceiver 20 embodied in FIG. 8 include eight (8) additional serial ports 210 (for a total of 9 external serial connections), and either a 4 or 8 port 10/100 Mbps Autosensing Ethernet switch 212. The addition of these hardware components eliminates the need for external devices such as the protocol box 15 and an Ethernet hub 175 (FIG. 7) or switch for LAN connections.

The network transceiver 20 also preferably includes light emitting diode 60 to indicate power, and light emitting diode 62 to indicate hard disk drive activity.

In an embodiment of the present invention the network transceiver 20 is contained in a wall, rack, or floor-mounted box-shaped unit. Preferably the network transceiver 20 includes CPU fans and uses an Intel-instruction set compatible CPU. The nature of the operating system is not dependant on Intel-instruction set compatibility and most available CPU categories and types are adapted in embodiments of the present invention by recompiling the source code for the target processor (PowerPC, StrongARM, 68000, i860, etc.).

The network transceiver is preferably a standard unit that can be installed in each property in less than an hour and compatible with existing location-level services 10. The network transceiver 20 also preferably includes an updateable drivers library so that necessary drivers can be added and/or upgraded for new or updated location-level services 10. The driver updates preferably occur remotely as drivers are "pushed" from the remote central server 40 to the network transceiver 20 as necessary for updates. The design and ongoing operation of the network transceiver 20 provides for a minimal up-front hardware cost and a minimal ongoing operational and support cost, providing substantial savings compared to prior art systems.

Overall lifecycle costs are reduced because: (1) no onsite support is required for service and upgrades; (2) remote monitoring of the network tranceiver 20 and the location-level services 10 automatically detects real time problems and allows proactive troubleshooting of network tranceiver 20 and the location-level services 10 to prevent the loss of revenue-producing data; (3) the costs and time of aggregating location-level data is greatly reduced; and (4) reliability of the data transport and aggregation is assured over prior art systems.

In embodiments of the present invention, an administrative management and reporting application allows centralized control and monitoring of all network transceiver 20 deployed at respective properties over the wide area network 30.

The administrative management and reporting application is accessed via an ASP-based web server, such as the remote central server 40. The administrative management and reporting application is linked to the system security model, and user visibility into a network transceiver 20 is limited by the rights and permissions granted under the security model.

The administrative management and reporting application allows authorized users to perform all aspects of maintenance of network transceivers 20 via a web-based user interface. Exemplary maintenance activities include: (1) rebooting or shutting down the network transceiver 20; (2) starting, stopping, or restarting various services/servers that run on the network transceiver 20; (3) installing, upgrading, or removing software on the network transceiver 20; (4) installing, upgrading, debugging, or removing interface drivers on the network transceiver 20; (5) inspecting the Network transceiver for unauthorized tampering including file size or content changes, new or undocumented file installations, new or altered the network transceiver 20 applications, file deletions, unauthorized system or user accounts, and other forms of intrusion; (6) inspecting the network transceiver's 20 log files; and (7) turning on and off various diagnostics applications that gather information about connectivity, interface activity, and security.

Maintenance activities can be targeted to an individual network transceiver 20 or groups of network transceivers 20. Network transceiver 20 groups can be defined by almost any metric including hardware or firmware revisions, customer, customer location, geographic location, method of primary Internet access, secondary or tertiary ISP, interfaces installed, or other delimiters. As features are added to the network transceiver 20 design, the maintenance of the feature is built into the management console.

Reporting can be targeted to an individual network transceiver 20 or groups of network transceivers 20. As with centralized management, network transceiver 20 groups can be defined by almost any metric including hardware or firmware revisions, customer, customer location, geographic location, method of primary Internet access, secondary or tertiary ISP, interfaces installed, or other delimiters. As features are added to the network transceiver 20 design, reporting on those features is added to the centralized reporting functionality.

Exemplary reporting functionality that can be accessed via the management console includes reviewing all events that are logged to the ASP's database including: (1) the site ID and site name of the customer location; (2) The status of connectivity (primary or backup communications with the ASP); (3) the IP address of the network transceiver 20; (4) the status of 115V power to the network transceiver 20; (5) the date and time stamp of the last heartbeat message from the network transceiver 20; (6) the types and version numbers of all interfaces loaded on that network transceiver 20; (7) the history of each interface on a network transceiver 20, such as when it was loaded, debugged, configured, upgraded) including the user who performed the work, (8) the hardware, firmware, and software versions of all installed software on the network transceiver 20; (9) the date and time stamp of the last communications with all interfaces connected to that network transceiver 20; (10) the last reboot time and date for the network transceiver 20; and (11) the uptime of the network transceiver 20 since the last reboot.

Referring to FIGS. 7 and 9, user workstation 25 connects to the network transceiver 20 via Ethernet connection 24 to port 54. Workstations need not connect via a hub connected to port 54. However, connections on the network transceiver's LAN (port 54) are protected by the built-in firewall. The network transceiver routes all workstation 25 traffic from port 54 to port 53. IP traffic from the workstations 25 is then forwarded to the next router as the packets make their way to the Internet.

High speed connection 53 connects network transceiver 20 and the user stations 25 to a wide area network, such as the Internet 30. The central server 40 includes a central data base 45 and a variety of central application services 48 accessible to users via a thin-client user interface on a user station 25, such as a web browser, with an Internet connection to access the remote central server 40. Because the user interface is preferably a web browser, users are not limited to connection to the central server 40 by a user station 25, but can connect from any remote location with a browser interface including computers, wireless devices, PDAs, and the like.

Preferably, any user desiring access to a central application server 48 and data in the database 45 must provide a password and be verified by the central server 40 for access to the application services 48 and database 45 on the central server 40. Access to the central application services 48 are restricted to authorized users. Depending on the permissions of the given authorized user, the appropriate views to the appropriate data are automatically served to said user.

The network transceiver 20 administrative servers 44 provide for the monitoring and management of network transceivers over the Internet. Monitoring and management activities provided by the administrative servers 44 include serving the ASP end of the messaging system, hosting the remote software administration application for the network transceivers, hosting a centralized time server used to synchronize the network transceivers, and centralized logging services to gather reporting data from the network transceivers 20 and connected location-level services 10 to the remote central server 40.

In the event the primary connection 24 fails, a back up analog modem dial-up connection to the Internet 22 is connected to the network transceiver 20 at modem port 55 (FIGS. 8 and 10), preferably configured to initiate a new connection automatically upon the failure of the primary connection 24. The back up connection 22, such as a dial-up telephone connection to the Internet 30, enables the network transceiver 20 to provide data to the central server 40 despite loss of the primary connection 24. Additionally, a secondary backup is preferably available, allowing the network transceiver to dial directly to the central server in the event the first two connections fail. Moreover, the network transceiver will send a message to the central server advising of the primary connection failure, thereby notifying the relevant technical support personnel.

In a further embodiment of the invention, the network transceiver will include yet a fourth step during primary failure, wherein the network transceiver will first dial the Internet Service Provider of the user prior to dialing the central server.

The network transceiver 20 further preferably provides a firewall to the user stations 25 and location-level services protocol box 10. A secured sockets layer connection between the user stations 25 and the central server 40 is preferably utilized in conjunction with the firewall to provide a secure exchange of data.

In various embodiments of the present invention, a property's existing device addressing scheme may utilize one of several methods for communication over a wide area network (WAN), such as the Internet. The methods include public or private IP address spaces, ISP-assigned DHCP addresses, or PPP over Ethernet. Each situation is individually assessed to determine if a VPN can be used.

Preferably WAN communications in the present invention are based on a 10.xxx.xxx.xxx private network address scheme. This allows the most flexibility in terms of the sheer number of nodes and subnetting possibilities.

Workstations 25 and printers 27 are preferably assigned IP addresses in accordance with the address scheme. In an embodiment of the present invention, DHCP is used to reduce the administrative overhead. However, other embodiments include mapping MAC addresses to IP Addresses on workstations 25 and printers 27.

In an embodiment of the present invention, Network Address Translation is used to convert the private addresses to a legal IP address for VPN routing over the Internet. Data is encrypted within this VPN "tunnel" to ensure privacy of data while traversing the Internet.

Referring to FIG. 9, an alternative embodiment of the invention as shown in FIG. 7 is disclosed. In FIG. 9, the protocol box 15 is eliminated and replaced by integrated eight (8) serial interfaces 210 and integrated Ethernet switch 212 in the network transceiver 20.

With reference to FIGS. 1, 7, and 9, in a preferred embodiment of the present invention, a message queuing system, SwiftMQ, and a monitoring application (TBMonitor) facilitate communications between the location-level services 10, network transceiver 20, and the remote central server 40.

TBMonitor runs continuously as a background process on the network transceiver 20. TBMonitor "talks" to the device drivers associated with each serial interface to the location-level services 10. The device drivers are pieces of software that know how to interact with various location-level services 10. The device drivers "talk" to these systems via serial ports. Each system requires a separate serial port on the network transceiver 20. The TBMonitor application polls each device driver to determine if it has information it needs to relay to TBMonitor or sends various commands to the device drivers. The commands that can be sent to a device driver depend on what equipment the driver interfaces with. If a device driver has information that needs to be relayed to the remote central server 40, TBMonitor polls the driver then asks the driver for the information.

Once TBMonitor has the information, it creates a message type appropriate for the information given (based on the device providing the information). Exemplary message types and associated applications utilized in embodiments of the present invention are provided in Appendix "A."

A new message is placed in the messaging queue of the SwiftMQ messaging system's background process on the network transceiver 20. A separate copy of the message is written to the network transceiver's log file. The network transceiver's SwiftMQ then delivers the message to a SwiftMQ messaging system background process on the remote central server 40.

Once the remote central server's SwiftMQ messaging system acknowledges receipt of the message, the network transceiver's SwiftMQ messaging system deletes its local copy of the message. The separate copy of the message written to the network transceiver's log file remains. Should the message be undeliverable, it remains in the network transceiver's messaging queue until the network transceiver's SwiftMQ background process can reestablish communications with the remote central server's SwiftMQ background process and confirm safe and accurate delivery. The network transceiver's messaging queue can hold many months of data.

At the remote central server 40, the SwiftMQ messaging process receives the message, writes it to disk, then sends an acknowledgement of receipt back to the sending network transceiver 20. SwiftMQ then notifies a monitoring and business logic process that it has a new message to pass into the multi-location management system. The monitoring and business logic process then receives the message from SwiftMQ. The monitoring and business logic process parses the message and populates various tables in the central database 45 depending upon the messages' origin. In one embodiment, the process is an enterprise java bean (EJB J2EE) business logic object, which runs, for example, on BEA's WebLogic™ application server platform.

Once in the database 45, a central application services' application 48 can utilize the data. For example, a guest's folio or bill may be updated. In this example, the SwiftMQ messaging system does not interact with a user interface in any way other than providing billing information data to the central database 45.

Figure 2:
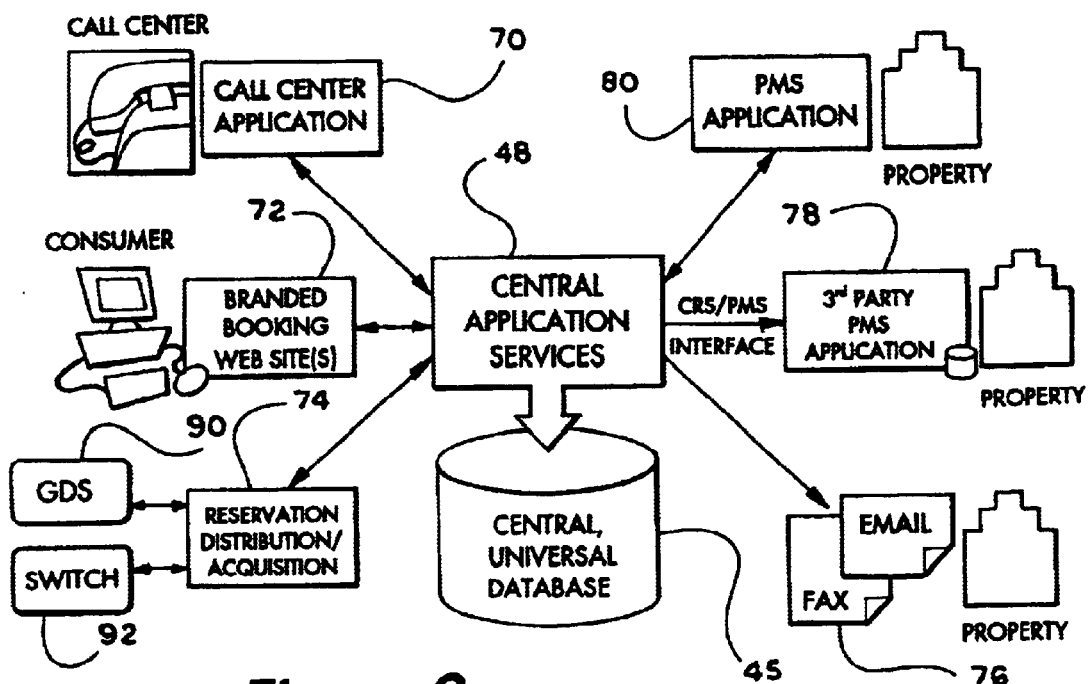
FIG. 2 is a block diagram depicting central application services that access a central, universal database to provide applications and data to various sources in an embodiment of the present invention.

Referring to FIG. 2, central application services 48 utilize data from the central database 45 of the central server 20. The central application services 48 include a variety of property-related applications.

Figure 4:
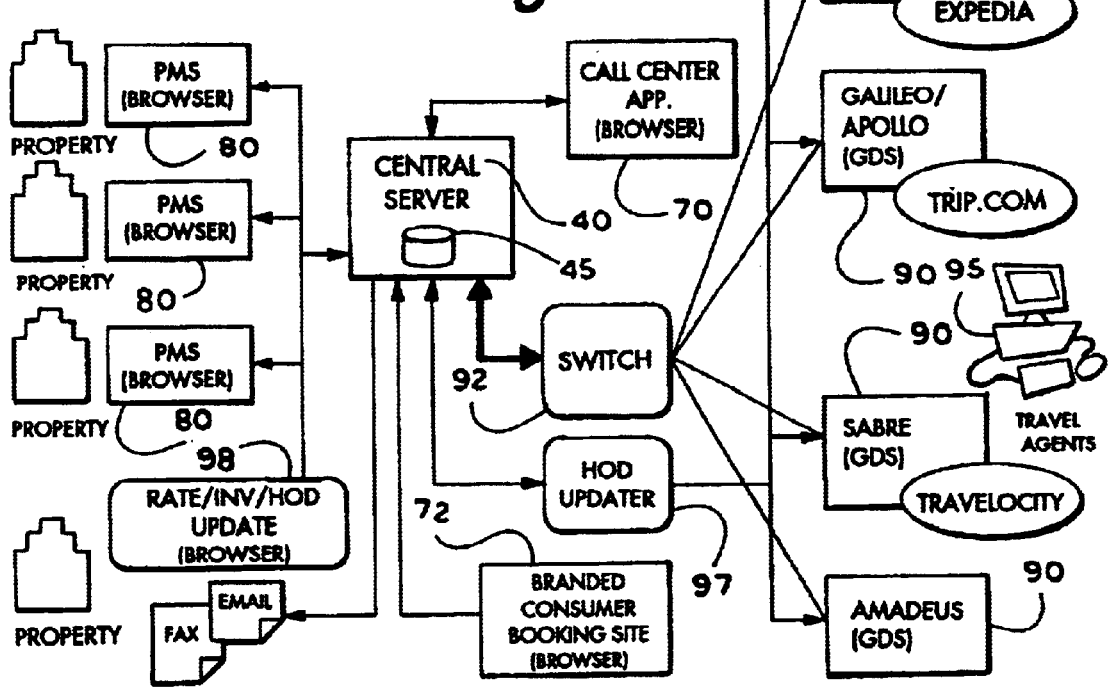
FIG. 4 is a relational block diagram depicting the integration of browser user interfaces and a call center application for distributing data to general distribution systems in an embodiment of the present invention.

Call center application 70 is a central application service 48 that enables a multiple location operator to manage and accept reservations for any property participating in the system of the present invention for which said location operator has the appropriate authorization. A user at the call center will access the call center application 70 to receive real-time data, such as room availability, from the central database 45. Referring to FIG. 4, a user at the call center can access the central server 40 and receive current, real-time data, including rate, location descriptive data, room availability, and the like, with respect to any location.

With continuing reference to FIGS. 2 and 4, an application service 48 may also include a branded booking engine toolset 72. Through a browser connected via the Internet to the central server 40 a consumer may obtain real-time room availability data from the central database 45. Further, when the reservation is placed, either through the call center application 70 or the branded booking engine toolset 72, the central database 45 is immediately updated to provide current property room availability data.

Figure 3:
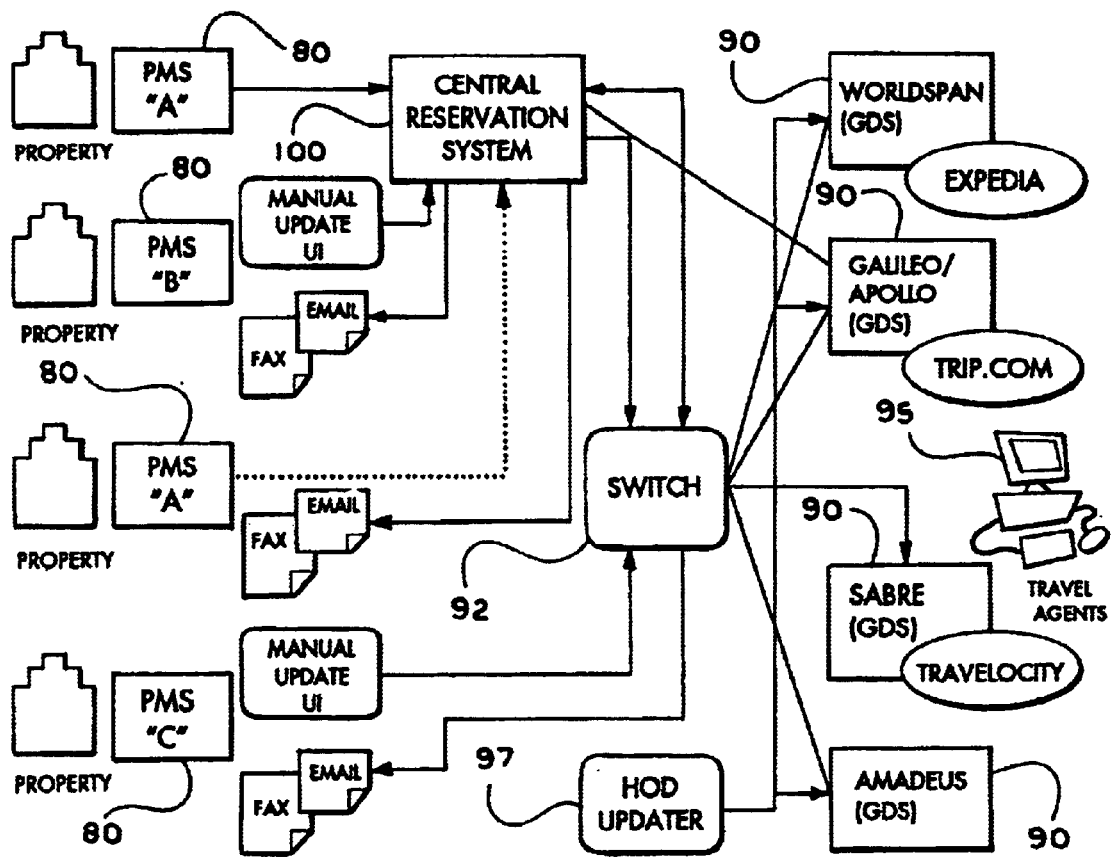
FIG. 3 is a relational block diagram of the prior art reservations system for multiple properties.

Referring to FIG. 3, the prior art reservation system in the hospitality industry is depicted. In the prior art system each property maintains an independent property management service 80. Via manual operations, such as telephone, facsimile, and e-mail, each property must constantly update room-availability and rate information to a central reservation system 100. A general distribution system (GDS) 90 tranceives data from a switch 92, which, in turn, tranceives data from the central reservation system 100. General distribution systems 90, such as WorldSpan, Galileo/Apollo, Sabre, and Amadeus, provide hotel descriptive data, room availability and rate information to travel agents 95 or consumer-accessible websites for reservations.

As shown in FIG. 3, the prior art collaborative process of distribution of and access to location information, including room inventory, rates, and location descriptive information is inefficient. Room inventory, rates and hotel descriptive data are repetitively stored in separate databases at different systems at discrete locations, such as: (1) property management system 80, (2) central reservation system 100, (3) switch 92, (4) HOD updater 97, and (5) general distribution system (GDS) 90.

These systems attempt to interface with one another. Such interfacing causes inefficiencies due to inadequate and delayed data synchronization and added costs to all users. The system and method of the present invention overcomes these inefficiencies and unnecessary costs by storing all location data in the central database 45 of the remote central server 40. With continuing reference to FIG. 3, in some instances where the systems are not interfaced with one another for a given location such location operators must manually update 81 data in multiple non-interfaced systems 90, 92, 97, and the like. The system and method of the present invention overcomes these inefficiencies and unnecessary costs by storing all location data in the central database 45 of the remote central server 40.

Because the independent property management services 80 may not provide information in real-time, the location data is typically inaccurate. Accordingly, unless a travel agent 95 or a consumer contacts the individual property directly, real-time location information may not be obtained, and, for example, rooms otherwise available may remain unbooked.

Referring again to FIGS. 2 and 4, reservation distribution/acquisition application service 74 provides real-time room availability and rate information from the central database 45 on the central server 40. Through a browser interface a user at each property can update property data, such as room availability, directly to the central server 40 via a property management service application 80 running as a central application service 48 from the central server 40. As a user at the property updates information through the property management service application 80 the data is immediately updated in the central server database 45. Similarly, HOD update/rate enables the updating of tables of property information such as pictures, local businesses, and the like, in the switches, GDSs, branded booking engines, etc.

Accordingly, the general distribution systems 90, and the GDS switch 92 have access to real-time property information from the central server database 45.

Figure 5:
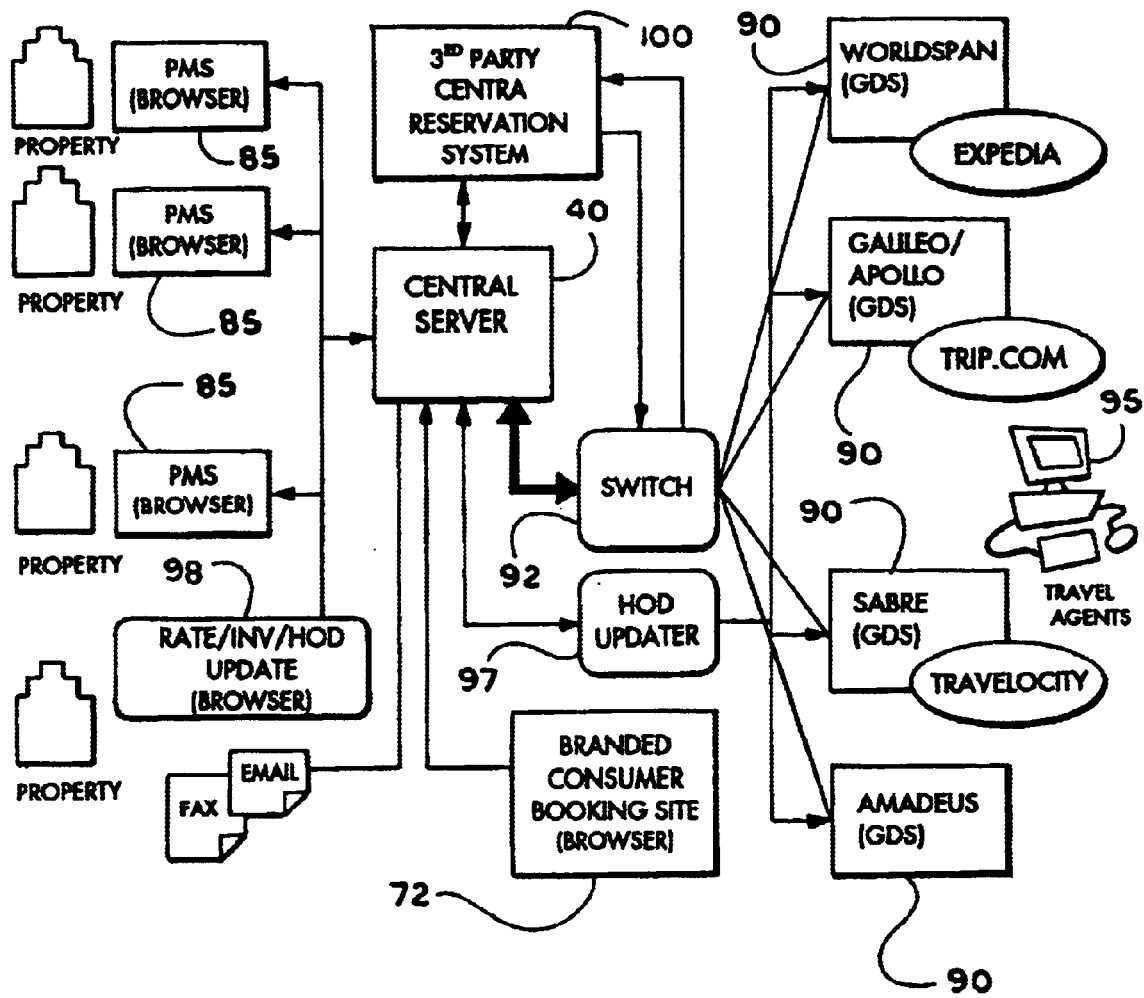
FIG. 5 is a relational block diagram depicting the integration of a central reservation system for distributing data to general distribution systems in an embodiment of the present invention.
Figure 6:
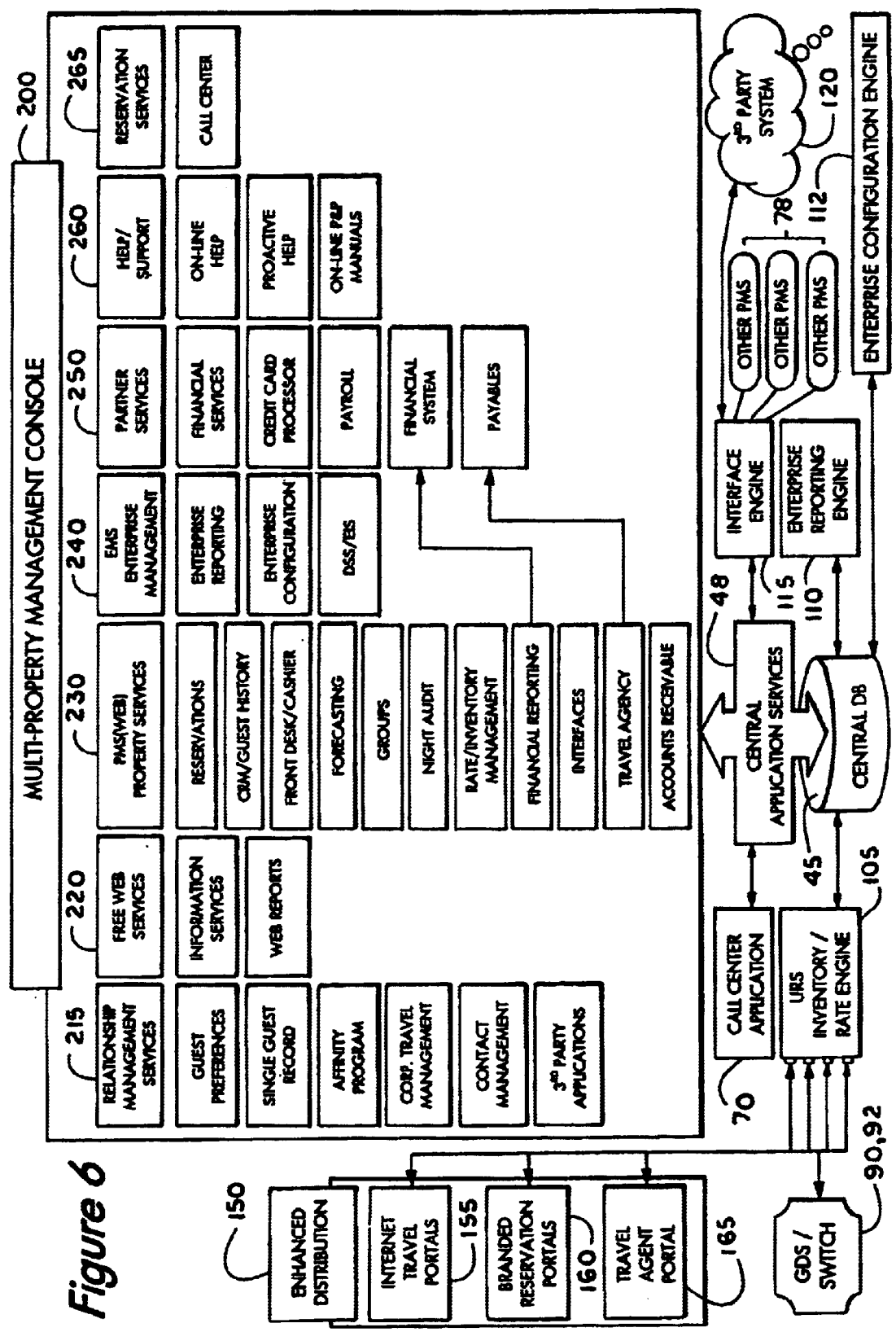
FIG. 6 is a relational block diagram of the multi-location management console interfacing the central application services and central database in an embodiment of the present invention.

Referring to FIG. 5, with respect to FIG. 4, in an exemplary embodiment, the system of the present invention interfaces to a third party reservation system 100. In a further embodiment, such interface to a third party reservation system 100 uses an interface engine 115 (FIG. 6).

With continuing reference to FIG. 2, fax and e-mail application services 76 are accessible from the central server 40 as a central application service 48.

Third-party property management service application 78 is an application permitting the utilization of centralized data with existing third-party, management property systems.

Property management service application 80 provides automated and centralized functions and reporting for handling customer accounting, daily audit and daily close activities, receivables and third party commissions (such as travel agent commissions) through a browser interface to the central server. Further, the property management service application 80 provides integrated customer history, customer relationship management, onsite customer fulfillment, including check-in and check-out wizards advance deposit management, credit card processing, package plan management and service charges, inventory management, group management, rate management, forecasting, inventoriable unit management, and physical plant status and maintenance management.

Referring to FIG. 6, a multi-location management console 200 includes a variety of central application services 48 for use by a user in the system of the present invention. Such services in the context of the hospitality industry include customer relationship management services 215, web services 220, property management services 230, enterprise management services 240, partner services 250, reservations services 265, and help/support services 260. The application services 48 share and exchange data with the central database 45.

The management console 200 is available to users through a user interface, such as a browser, connected to the remote central server 40 over the Internet. Available central application services 48 are preferably user or location, or multi-location, specific depending on the subscription.

Central application services 48 exchange data with the central database 45 on the remote central server 40 to provide necessary functions and information to the user interface.

In addition to the central application services 48 in the management console, 200, several other applications and engines preferably share data with the central database 45 to render additional web-based services. For example, referring again to FIG. 4, a reservationist at the call center can access the central server 40 through a browser and receive current, real-time data and room availability with respect to any property.

The central remote server 40 interfaces via interface engine 115 with other third-party systems 120 to exchange data such as accounting information, property information, customer demographic information, customer history information, and the like. The advantages of the interface engine 115 over prior art systems are: (1) the centralization of the data; (2) only one interface needs to be built the remote central server 40 and third party systems 120, as opposed to an interface between third party systems 120 and each location level system 78 (FIG. 2); and (3) data from all locations has been aggregated, thereby assuring completeness and accuracy of enterprise data.

The central remote server 40 provides multi-location (enterprise) reporting via the enterprise reporting engine 110 to provide consolidated reporting data such as accounting information, property information, customer demographic information, customer history information, and the like. The advantages of the enterprise reporting engine 110 over prior art systems are: (1) the centralization of the data; (2) data is accessible on a real-time basis, which provides a significant advantage over the prior art systems, that typically batch reporting data which is not accessible for at least 24 hours; (3) data from all locations has been aggregated, thereby assuring completeness and accuracy of enterprise data; and (4) data integrity is assured and costs are reduced, which provides a significant advantage over the prior art systems, that involve manual re-keying of data. The reporting engine 110 can interface through the interface engine 115 to third party systems 120, including third party property management systems 78.

The enterprise configuration engine 112 includes a set of modules that allows for centralized configuration of multiple locations and the data and processes associated therewith via the remote central server 40. For example, an authorized user can modify and configure configuration data entities, such as rates, inventoriable units (such as rooms in a hotel, tee times, etc.), transaction types (such as accounting, third party payable accounts, etc.), marketing categories, taxes, location information, user authorization, and the like, centrally against the central database 45 for some or all locations enterprise-wide. The advantage over the prior art is that users do not have to contact each property individually to carry out these configurations, thus ensuring enterprise-wide compliance and single entry configuration across a plurality of locations.

In an embodiment of the invention, the enterprise configuration engine 112 configures a configuration data entity, such as rates, inventoriable units (such as rooms in a hotel, tee times, etc.), transaction types (such as accounting, third party payable accounts, etc.), marketing categories, taxes, location information, user authorization, and the like, such that said configuration data entity is accessible by one or more locations in the enterprise. As an example, an enterprise may include some locations that have golf course and other locations that do not A configuration data entity such as "green fees transaction type" can be created once in the remote central server 40 and made accessible to only those locations with golf courses. In other embodiments configuration data entities (such as "tax transaction type") are made accessible to all locations in the enterprise.

With continuing reference to FIG. 6, after the enterprise configuration engine 112 generates one or more configuration data entities, the universal reservation system inventory/rate engine 105 utilizes one or more configuration data entities from the central database 45 to manage rates and inventory for use by the central application services 48 and accessible to one or more locations enterprise-wide and distribution channels 150 such as internet travel portals 155, branded reservation portals 160, travel agent portals 165, switches and GDSs 90 & 92, and the like. In embodiments of the present invention, configuration data entities can be added, modified or inactivated at any time for use by the central application services 48. In other embodiments of the present invention, third party systems 120 access configuration data entities.

While the invention has been described with reference to structures and methods disclosed, it is not confined to the details herein but is intended to cover such modifications or changes as may fall within the scope of the following claims.

What is claimed is:

1. A multi-location management system comprising:
   a) a location-level service resident on a first location;
   b) a network transceiver resident on the first location, wherein the network transceiver resident on the first location is connected to a wide area network;
   c) a location-level interface for delivering data from the location-level service resident on the first location to the network transceiver resident on the first location;
   d) a location-level service resident on a second location;
   e) a network transceiver resident on the second location, wherein the network transceiver resident on the second location is connected to the wide area network;
   f) a location-level interface for delivering data from the location-level service resident on the second location to the network transceiver resident on the second location;
   g) a remote central server connected to the wide area network, wherein the remote central server receives data from both the network transceiver resident on the first location and the network transceiver resident on the second location, and wherein the remote central server integrates said data from both the network transceiver resident on the first location and the network transceiver resident on the second location for delivery to a central services application; and
   h) a user interface for accessing the central services application and exchanging data between the remote central server and a user.

2. The multi-location management system of claim 1 wherein the user interface is a web browser.

3. The multi-location management system of claim 2 wherein the central server includes a central services application that is accessed by the web browser.

4. The multi-location management system of claim 3 wherein the network transceiver resident on the first location includes a firewall.

5. The multi-location management system of claim 1 wherein the network transceiver resident on the first location includes a firewall.

6. The multi-location management system of claim 5 wherein the network transceiver resident on the first location includes an uninterruptible power supply source.

7. The multi-location management system of claim 6 further comprising a power monitor application that is notified by the uninterruptible power supply source to gracefully shut down the network transceiver resident on the first location when the network transceiver resident on the first location after electrical power to the network transceiver resident on the first location is interrupted for a predetermined time.

8. The multi-location management system of claim 7 wherein the power monitor application further notifies the remote central server of shut down of the network transceiver.

9. The multi-location management system of claim 6 wherein the network transceiver resident on the first location includes means for buffering data destined for the central server.

10. The multi-location management system of claim 3 wherein the location-level service resident on the first location is selected from the group consisting of call accounting subsystem, private branch exchange, room keys, mini-bar, telephony, key card systems, point of sale systems, energy management systems, environmental control systems, security systems, in-room safe systems, in-room fax systems, video check-in and check-out, parking gate systems, ticketing systems, electronic door lock systems, interactive voice response systems, voice mail, and in-room movies.

11. The multi-location management system of claim 10 wherein the network transceiver resident on the first location includes a firewall, an uninterruptible power supply source, and means for buffering data destined for the central server.

12. The multi-location management system of claim 3 wherein the central services application is a property management services application.

13. The multi-location management system of claim 3 wherein the central services application is a reservations system application.

14. The multi-location management system of claim 3 wherein the central services application is an inventory management application.

15. The multi-location management system of claim 3 wherein the central services application is a procurement application.

16. The multi-location management system of claim 3 wherein the central services application is rate and revenue management application.

17. The multi-location management system of claim 3 wherein the central services application is an accounting application.

18. The multi-location management system of claim 3 wherein the central services application is a financial reporting application.

19. The multi-location management system of claim 3 wherein the central services application is a customer relationship management service application.

20. The multi-location management system of claim 3 wherein the central services application is a forecasting application.

21. The multi-location management system of claim 3 wherein the central services application is a yield management application.

22. The multi-location management system of claim 3 wherein the central services application is a business intelligence application.

23. A method for managing location-level services data for multiple locations comprising:
   a) receiving first location-level service data into a first network transceiver from a first location-level service located on a first location;
   b) receiving second location-level service data into a second network transceiver from a second location-level service located on a second location;
   c) persisting the first location-level service data on the first network transceiver upon receipt from the first location-level service;
   d) persisting the second location-level service data on the second network transceiver upon receipt from the second location-level service;
   e) transmitting the first location-level service data to a remote central server over a wide area network connection between the first network transceiver and the remote central server via a guaranteed delivery message queueing system;
   f) transmitting the second location-level service data to the remote central server over a wide area network connection between the second network transceiver and the remote central server via a guaranteed message queueing system; and
   g) integrating the first location-level service data and the second location-level service data into a property management application available to a user from the remote central server over the wide area network via a user interface to the wide area network.

24. The method of claim 23 wherein the user interface is a web browser.

25. The method of claim 24 wherein the location-level service located on the first location is selected from the group consisting of call accounting subsystem, private branch exchange, room keys, mini-bar, telephony, key card systems, point of sale systems, energy management systems, environmental control systems, security systems, in-room safe systems, in-room fax systems, video check-in and check-out, parking gate systems, ticketing systems, electronic door lock systems, interactive voice response systems, voice mail, and in-room movies.

26. A method for managing location-level services data for multiple locations comprising:
   a) transmitting a first location-level control command from a remote central server over a wide area network connection to a first network transceiver;
   b) transmitting a second location-level control command from the remote central server over a wide area network connection to a second network transceiver;
   c) persisting the first location-level control command on the first network transceiver upon receipt from the remote central server via a guaranteed delivery message queueing system;
   d) persisting the second location-level control command on the second network transceiver upon receipt from the remote central server via a guaranteed delivery message queueing system;
   e) transmitting the first location-level control command from the first network transceiver to a first location-level service located on the first location;
   f) transmitting the second location-level control command from the second network transceiver to a second location-level service located on the second location;
   g) carrying out the first location-level control command at the first location-level service;
   h) carrying out the second location-level control command at the second location-level service.

* * * * *